March 12, 1963

L. A. VOGL 3,081,410

ELECTRICAL CONTROLLING APPARATUS

Filed Jan. 24, 1957

INVENTOR.
LAWRENCE A. VOGL
BY
Christopher L. Waal
ATTORNEY

United States Patent Office 3,081,410
Patented Mar. 12, 1963

3,081,410
ELECTRICAL CONTROLLING APPARATUS
Lawrence A. Vogl, 711 Emerson Ave.,
South Milwaukee, Wis.
Filed Jan. 24, 1957, Ser. No. 636,127
9 Claims. (Cl. 307—141.8)

This invention relates to electrical controlling means, and more particularly to controlling apparatus and systems for use in carrying out a cycle or sequence of operations in a machine or process.

In a well known form of plastic molding machine or press, a pair of relatively movable heated dies forming a die cavity between them are brought together and separated by a hydraulic cylinder or main ram the piston of which is secured to a platen on which one of the dies is mounted. Thermosetting molding material is deposited in the press while the press is open, and after the press is closed the molding material is injected into the die cavity by a transfer ram and sets in the dies under pressure. During the molding cycle the pressure is relieved one or more times to permit escape of gases, this being known as breathing or degassing and being effected by slightly separating the dies. Thereafter high pressure is applied for a predetermined time to shape and cure the molded article, following which the press is opened and the article is removed. The duration of the various steps in the molding cycle will differ depending on the type of material, the shape and volume of the article, the density required, and other considerations.

An object of the invention is to provide improved means for controlling the timing of the individual steps in a process cycle, and which is capable of easy adjustment to control a wide variety of different cycles.

Another object is to provide time-controlled means which will afford accurate timing of rapidly succeeding events in a process cycle and will also handle process cycles of considerable duration.

Still another object is to provide time-controlled means which will enable repetition of steps in a process cycle in a relatively simple manner.

A further object is to provide electrical controlling means which will facilitate individual adjustment of a considerable number of successively acting circuit-controlling switch elements.

A further object is to provide electrical controlling means which is reliable in operation and capable of inexpensive manufacture and convenient maintenance.

A further object is to provide for safe operation of a process cycle controller and an associated apparatus or system.

A further object is to provide electrical controlling means which is particularly suitable for the control of plastic molding presses and the like.

The invention further consists in the several features hereinafter described and claimed.

In the accompanying drawings,

FIG. 4 is a sectional elevational view of the controller, taken generally on the line 4—4 of FIG. 2, contactor arms of main and auxiliary timers thereof being shown in starting or initial position, and a maximum advanced position of the main timer contactor arm being shown in broken lines;

FIG. 5 is a detail sectional view of the main timer contactor arm and its operating mechanism, taken generally on the line 5—5 of FIGS. 1 and 4, parts of the main timer motor being shown in developed relation;

FIG. 6 is a detail sectional view of the main timer motor, taken generally on the line 6—6 of FIG. 5;

FIG. 7 is an outer end view of the main timer contactor arm, parts being shown in section, and parts of a cooperating contact member being shown in engagement with a contact shoe of the arm;

FIG. 8 is a perspective view of a contact member;

FIG. 9 is a fragmentary detail sectional view of a dashpot for the main timer mechanism;

FIG. 10 is a detail sectional view of an auxiliary timer contactor arm and operating mechanism, taken generally on the line 10—10 of FIG. 4.

In the drawings, 15 designates a controller chassis comprising a vertical rectangular front panel 16, a vertical rectangular inner panel 17, and a vertical rectangular rear panel 18, all formed of insulating material such as Bakelite, these panels being rigidly secured together in spaced parallel relation by nutted corner studs 19 and 20 and tubular spacers 21 and 22 surrounding the studs.

The controller chassis, which is hereinafter more fully described, is detachably housed in a compartment of a sheet metal cabinet 23 the front of which is closed by a swingable, peripherally flanged door 24 secured thereto at one side by a hinge 25 and at the other side by a hasp or latch 26. The door is provided with a transparent window 27, and has a peripheral dust-excluding gasket 28 engageable with the front edge of the cabinet. The corner portions of the front panel 16 are detachably clamped by screws 29 to angle brackets 30 fastened in the cabinet. The inner and rear panels 17 and 18 are narrower than the front panel so as to clear the angle brackets, and the rear panel is of reduced height. The cabinet has chassis-guiding side bars 30' which extend along its bottom wall.

Figures 2, 3:
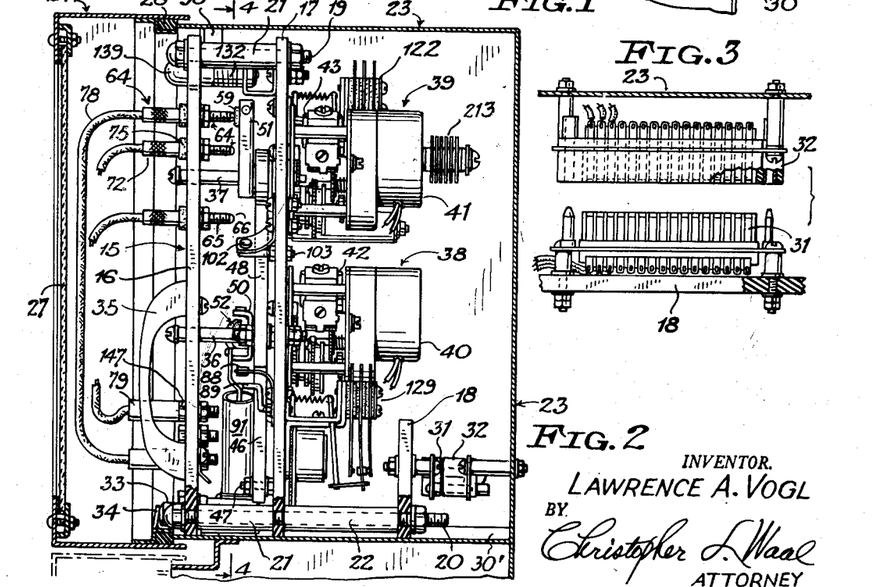
FIG. 2 is a side elevational view of the controller, parts thereof and a cabinet therefor being shown in section.
FIG. 3 is a detail top view of an electric connector for the controller in disconnected position, parts being shown in section.

The rear chassis panel 18 has secured thereto a centrally disposed, rearwardly projecting multiple-contact plug 31 cooperating with a multiple-contact receptacle 32 rigidly fastened to the rear wall of the cabinet, as seen in FIGS. 2 and 3, the latter view showing the plug and receptacle separated. The plug and receptacle form an electrical connector to establish various electrical circuits hereinafter described when the chassis is inserted into the cabinet. A normally open, double-pole safety switch 33 of the push-button type is secured to the central lower portion of the front panel and is actuated to closed position by a lug 34, FIG. 2, on the cabinet door when the door is closed. The front panel of the controller chassis is provided near opposite sides with handles 35 to facilitate insertion and removal of the chassis.

Journalled in the inner panel 17 are a main timer shaft 36 and an auxiliary timer shaft 37, both shafts extending forwardly through the front panel at right angles thereto, and, if desired, being also journalled in the front panel. The timer shafts are driven by respective clutch-type timing motor devices 38 and 39, hereinafter described, mounted on the rear face of the inner panel 17. The timing motor devices include respective electric motors 40 and 41 of the self-starting synchronous or other constant speed type, and further include respective clutch electromagnets 42 and 43 which are energized to clutching position. Each of the timer shafts is rotatable clockwise in a timing travel by its motor through a maximum angle of about 180°, and is resettable in counter-clockwise direction to its starting or zero position. By way of example, the main timer shaft 36 has a 1.5 minute time range, and the auxiliary timer shaft 37 has a 3 minute time range. The timer shafts have respective hubs 44 and 45 adjacent to the inner panel 17. A resetting or bias spring 46 of the torsion type, FIGS. 4 and 5, surrounds the hub 44 of the main timer shaft and has one end secured to the hub and the other end anchored on the panel 17 by a screw 47. A similar resetting spring 48 is provided for the auxiliary timer shaft, FIGS. 4 and 10, and is anchored on the inner panel by a screw 49.

A radially extending metal contactor arm 50 of channel cross-section is rigidly secured to the hub 44 of the main timer shaft, and a similar but shorter arm 51 is secured to the hub 45 of the auxiliary timer shaft. The main contactor arm 50 carries at its front face a plurality of contactor shoes 52, three being shown, at different radii from the shaft axis, each shoe being secured to the outer end of a leaf spring 53 riveted at its inner end to the web of the arm. Wire stop springs 54 riveted to the arm limit the forward deflection of the shoe-carrying leaf springs. Each contactor shoe comprises an arcuate segmental insulating member 55, such as of a wear-resistant melamine plastic, having a shallow recess 56, FIG. 7, in its flat rear face receiving the associated leaf spring, and further having a cylindrically curved convex front face the axis of curvature of which extends generally radially of the arm. A yoke 57 formed of rectangular wire, such as of silver, or silver-faced metal, embraces the insulating shoe member 55 and has its legs passing through and riveted to the leaf spring. The straight intermediate portion of the yoke 57 forms a contact bar 57' which extends radially of the contactor arm and is inset in a groove 58, FIG. 7, formed in the arcuate face of the insulating member 55 to lie flush with this face. Each contact bar 57' is preferably offset from the radial center line of the contactor arm to place the leading edge of the bar slightly rearward of this center line. If desired, the leaf springs 53 may be bent or shifted to adjust the position of the contact bars. The contactor arm 51 of the auxiliary timer is provided with a single similar contactor shoe 59 mounted on a leaf spring 53'.

The insulating front panel 16 is provided with three semi-circular slots 60, 61 and 62 concentric with the main timer shaft 36, the radii of the slots corresponding to the radii of the paths of the contact shoes 52. The front panel is further provided with a similar semi-circular slot 63 concentric with auxiliary timer shaft 37 and having the same radius as the arcuate path of the contactor shoe 59.

A plurality of contact pins or stems designated generally by the numeral 64 extend through the arcuate panel slots at right angles to the front panel and are secured in adjusted position along the slots to slidably engage the contact shoes carried by the contactor arms. Each contact pin includes a threaded stud 65 having a silver contact 66 at its inner end. A pair of nuts 67 and 68 and interposed washer 69 are mounted on the stud to adjust the axial position of the stud contact 66. The nut 67 is of hardened steel and has knurled flat abutment faces 70, FIG. 8, engageable with the inner face of the front panel. The nut 67 is further provided with a key projection 71 slidably fitting in the panel slot to resist rotation of the stud. The outer portion of the stud carries in succession a nut-forming screw sleeve 72, a lock washer 73, a plain washer 74 and an insulating cup washer 75, the latter bearing on the front face of the front panel and enclosing the metal washers 73 and 74. By manually tightening the screw sleeve 72, the screw stud 65 will be locked in adjusted position along the slot. The insulating cup washer 75 prevents metallic contact with a closely adjacent contact pin. The outer or front end of each contact stud has an axial bore 76 in which is secured, as by a metal wedge pin 77, a flexible jumper-forming conductor cord 78, thus obviating a soldering operation which might weaken the wires. The other end of the conductor cord is connected to a plug 79, such as a banana plug, thus forming a jumper for making selected circuit connections, as hereinafter described. Each arcuate panel slot has a circular end enlargement 80 permitting easy mounting and dismounting of the contact pin assemblies.

The main timer shaft 36 is provided at its front end with a pointer 81 which is movable over a time scale 82 on the front panel, this scale extending over 180° and in the present instance being graduated for a range of 1.5 minutes. The auxiliary timer shaft 37 is provided at its front end with a similar pointer 83 which is movable over a time scale 84 extending over 180° and graduated for a range of 3 minutes. The time scales extend to the panel slots and facilitate accurate positioning of the contact pins 64. Wear on the contact pin tips 66 will not appreciably affect the timing.

The starting or zero position of the main timer contactor arm 50 is determined by an adjustable stop screw 85 carried on a bracket 86 secured to the front of the inner panel 17. The maximum timing travel of the contactor arm is determined by a limit switch comprising a contact 87 carried on the arm and engageable with a resiliently mounted contact 88 carried on the inner panel, this limit switch controlling a disabling circuit hereinafter described. A stop screw 89 on the inner panel serves to limit the maximum travel of the contactor arm. In its return travel to starting position the contactor arm 50 of the main timer shaft actuates to closed position a normally open limit switch 90 which is mounted on the panel 17 and is connected in circuit as hereinafter described to prevent premature starting of a new cycle of operation.

A dashpot is provided for suitably limiting the rate of return or resetting travel of the main timer contactor arm under urge of the torsion spring 46 in order to avoid damage to the mechanism. The dashpot comprises an air cylinder 91 having a pivotal mounting 92 at its lower end on the inner panel 17. A piston 93, such as of graphite, is slidable in the cylinder and has secured thereto a connecting rod or tail rod 94 the upper end of which is pivotally connected at 95 to the contactor arm, the axes of the cylinder pivot 92 and arm pivot 95 being parallel to the axis of the main timer shaft, and the rod 94 having a bent portion 96 to clear the shaft 36 when the arm is swung toward its advanced position. The lower end of the air cylinder is closed by a head 97 having a flow-limiting valve screw 98 which is retained in adjusted position by a coiled spring 99 surrounding the screw. The air cylinder has no appreciable retarding effect on the timing travel of the contactor arm, since the rate of timing travel is relatively slow.

The return or resetting travel of the auxiliary timer contactor arm 51 is limited by a stop screw 100, and the timing travel is limited by a switch comprising a contact 101 on the arm engageable with a resiliently mounted contact 102 on the inner panel, this limit switch controlling a disabling circuit hereinafter described. A stop screw 103 on the inner panel serves to limit travel of the contactor arm if the disabling circuit should fail.

Except as hereinafter noted, each of the clutch-type timing motor devices 38 and 39 is of conventional type per se and includes a differential gear mechanism, FIGS. 5 and 6, comprising a toothed input shaft 104 forming a sun wheel element, a ring gear element 105 with inner and outer teeth, and a planet carrier 106 with pinions 107 meshing with the inner teeth of the ring gear element. The sun wheel shaft is driven by the timing motor 40 (or 41) through suitable reduction gearing 108. The planet carrier has a gear 109 which meshes with a gear 110 on the timer shaft 36 (or 37). The outer teeth of the ring gear element mesh with a pinion 111 on a tubular clutch shaft 112 rotatably mounted on a pin 113 secured to an embossment 114 on a frame plate 115 of the timing motor device. The tubular shaft 112 carries a ratchet wheel 116 substantially larger in diameter than the pinion 111 and disposed near the embossment 114. The armature 117 of the electromagnet 42 (or 43) carries a spring pawl 118 engageable with the ratchet wheel to prevent rotation thereof whenever the electromagnet is energized, thus forming a clutch preventing rotation of the differential ring gear, so that the timing motor will drive the timer shaft through the planet carrier 106 of the differential gear mechanism when the motor is running, and will hold the timer shaft in stationary position when the motor is stopped. When the electromagnet is deenergized, the ring gear is free to turn, permitting the arm-carrying shaft to be returned or reset to its starting position by its torsion spring whether or not the motor is running.

An improvement on the conventional timing device above described consists in providing a light compressed coiled spring 119 around the embossment 114, the spring bearing at one end on the motor frame plate 115 and at the other end on a felt washer 120 engaging a face of the ratchet wheel 116. During operation of the mechanism the coiled spring 119 places the ratchet wheel under a slight friction and winds up to some extent, thus removing backlash from the gearing and increasing the timing accuracy.

Another improvement consists in providing a torsion spring 121 on the planet carrier 106 to remove backlash from the gears 109 and 110, thus further increasing timing accuracy. The torision spring 121 acts on the planet carrier in a direction opposite to that exerted by the resetting torsion spring 46 (or 48) for the contactor arm.

As hereinafter more fully described, the timer arms 50 and 51 of the main and auxiliary timing devices, in their slow forward travel, momentarily engage the contact pins 64 adjustably fixed on the slotted front panel 16 to control various circuits, including a number of relays here designated by the numerals 122, 123, 124, 125, 126, 127, 128, 129 and 130. These relays are indicated in the wiring diagram of FIG. 11, and are here shown mounted on the rear face of the inner chassis panel 17, as indicated in FIGS. 2 and 4. There is also provided an additional relay 131 exterior to the timer assembly and controlled as hereinafter described. The panel 17 carries at its upper portion a number of lamp sockets 132 for respective indicator lamps 133, 134, 135, 136, 137, 138 and 139, such as neon lamps, connected in circuit as hereinafter described, these lamps being exposed at openings 140 in the front panel 16.

Figure 1:
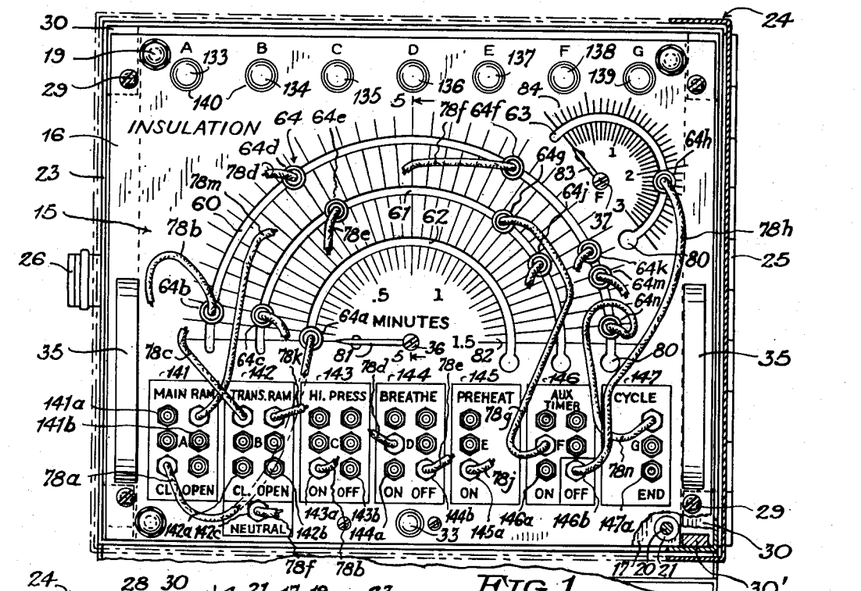
FIG. 1 is a front elevational view of an electrical controller embodying the invention, parts thereof and parts of a cabinet door being shown in section.
Figure 11:
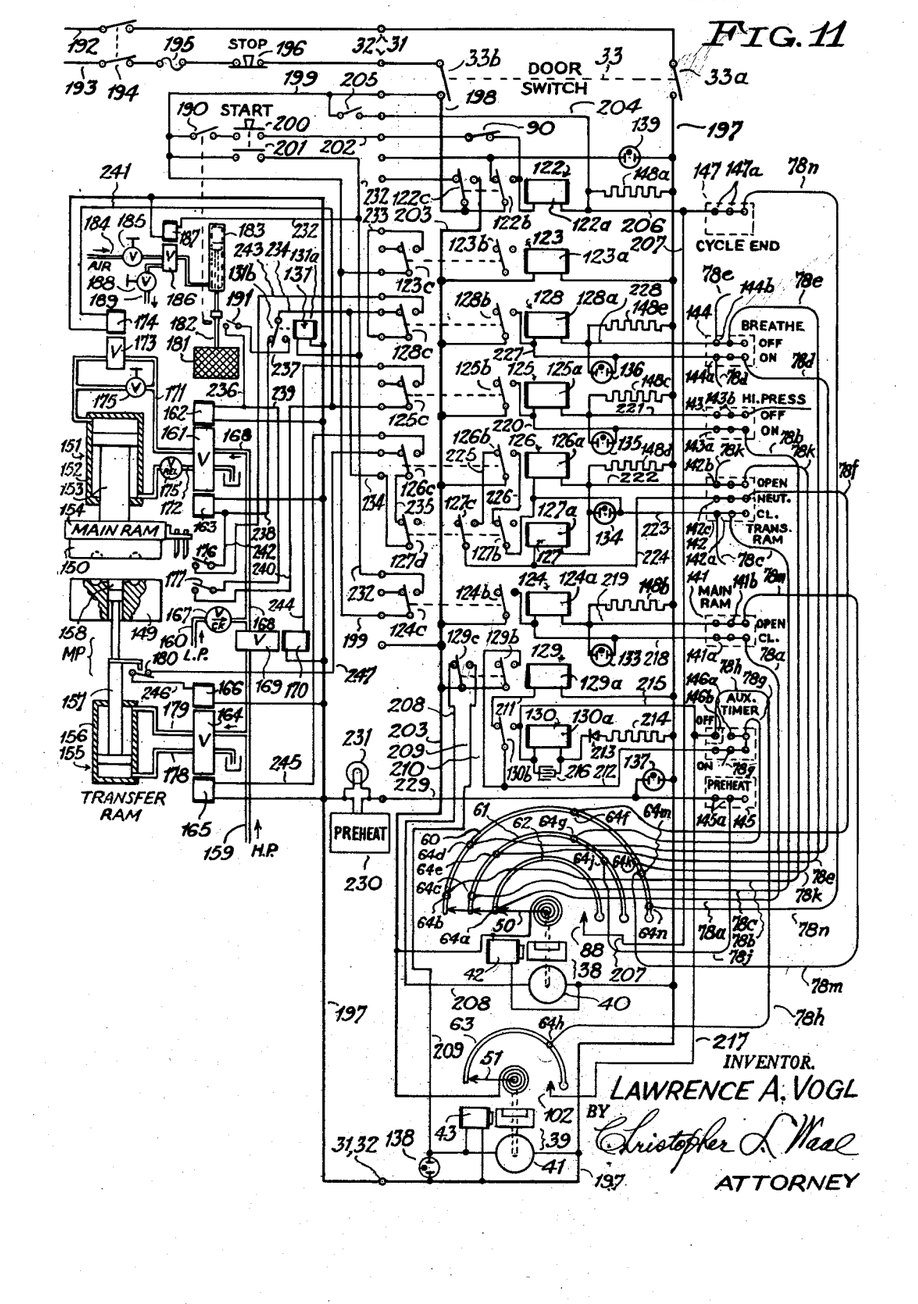
FIG. 11 is a diagrammatic view, including circuit connections, showing an application of the invention to a plastic molding press.

At the lower portion of the front panel are mounted groups of jacks designated generally by the numerals 141, 142, 143, 144, 145, 146 and 147. The jacks are connected to the relays and other circuit elements as hereinafter described, and selectively receive the plugs 79 on the flexible jumper cords 78, thus forming a switchboard. As shown in FIGS. 1 and 11, the jack groups are respectively identified by the legends "Main Ram," "Trans. Ram," "Hi. Press," "Breathe," "Preheat," "Aux. Timer," and "Cycle End," these legends being appropriate when the apparatus is used for the control of a plastic molding press of the transfer type hereinafter more fully described. The jack group 141 includes sets of jacks 141a and 141b for control of the closed and open positions of the main ram of the press. The jack group 142 includes sets of jacks 142a and 142b for control of the closed and open positions of the transfer ram of the press, and one or more packs 142c for controlling a neutral condition of the transfer ram. The jack group 143 includes sets of jacks 143a and 143b for the "On" and "Off" control of high pressure for the main ram, and the jack group 144 includes sets of jacks 144a and 144b for a "breathing" or "degassing" control. The jack group 145 includes jacks 145a for control of a preheater circuit hereinafter described. The jack group 146 includes a set of "On" jacks 146a and an "Off" jack 146b for control of the auxiliary timer, and the jack group 147 includes jacks 147a for controlling termination of the process cycle.

Certain of the relays 122 to 130, after being initially energized by momentary switch operation, are maintained in energized condition by holding circuits and are subsequently deenergized by momentarily short-circuiting or shunting the relay windings, the operating current being limited by respective series resistors designated generally by the numeral 148 and more specifically by the numerals 148a, 148b, 148c, 148d and 148e, these resistors being mounted at the rear of the inner panel 17. In some instances, the current-limiting resistors may be in the form of incandescent lamps.

As shown schematically in FIG. 11, the controller is connected in a system including a plastic molding press MP of conventional construction, and serves to control the molding cycle. The press is here shown to be of the transfer type including a stationary lower die 149 and vertically movable upper die 150. A double-acting main ram 151 includes an elevated hydraulic cylinder 152 and a downwardly projecting plunger 153 vertically movable therein. At its lower end the plunger carries a platen 154 on which the upper die 150 is mounted. A double-acting transfer ram 155 disposed below the lower die includes a hydraulic cylinder 156 and an upwardly projecting plunger 157 vertically movable therein, the upper end of the plunger being slidable in the fixed lower die 149 to force molding material into the die cavity when the press is closed. When the transfer plunger is in retracted position, a space or chamber 158 is formed above this plunger to receive a deposit of molding material. This material may be in granular form or may comprise one or more slugs of predetermined size.

The main and transfer ram cylinders 152 and 156 are supplied with oil under pressure from a high-pressure supply line 159, and the main ram cylinder is also supplied with oil from a low-pressure supply line 160. The main ram cylinder is controlled by a four-way three-position valve 161 of conventional type having actuating electromagnets 162 and 163. The transfer ram is controlled by a similar valve 164 having actuating electromagnets 165 and 166. The low-pressure supply line 160 is connected through a check valve 167 to an inlet pipe 168 for the main ram control valve 161, and the high-pressure supply line 159 is connected to the inlet pipe through a normally closed two-position valve 169 actuated to open position by an electromagnet 170. The high-pressure supply line 159 is directly connected to the inlet of the transfer ram control valve 164. The upper and lower ends of the main ram cylinder are connected to the control valve 161 by respective pipes 171 and 172, the former having therein a normally open two-position valve 173 with an actuating electromagnet 174 to close the valve, and the latter valve being shunted by an adjustable flow-limiting throttle valve 175. When the electromagnet 162 of the control valve 161 is energized, oil pressure is applied to the upper side of the main ram plunger for advancing the ram to press-closing position, and when the companion electromagnet 163 is selectively energized, oil pressure is applied to the lower side of the ram plunger to lift or retract the ram from closed position. The pipe 172 includes the usual spring-loaded relief or holding valve 175' to prevent gravity descent of the main ram plunger. The main ram platen 154 actuates normally open limit switches 176 and 177 which are closed when the press is closed, and which are connected in circuit as hereinafter described. The lower and upper ends of the transfer ram cylinder 156 are connected to the control valve 164 by respective pipes 178 and 179. When the electromagnet 165 of this valve is energized, oil pressure is applied to the lower side of the transfer ram for lifting or advancing the ram to inject the molding material from the chamber 158 into the die cavity, and when the electromagnet 166 is energized oil pressure is applied to the upper side of the ram to retract the ram. In its retracted position the transfer ram plunger opens a normally closed limit switch 180 which is connected in series with the actuating electromagnet 166 of the transfer ram control valve so as to deenergize this electromagnet.

It is customary to equip a molding press with a safety gate or guard member which when in guarding position will prevent the operator from placing his hands near the dies. In the improved apparatus of the present invention the press is provided with a vertically movable safety gate or guard member 181, FIG. 11, which is carried on the lower end of a vertical piston rod 182 slidable in an air cylinder 183. The gate descends by gravity to a die-guarding position and is retracted or lifted out of guarding position by air pressure. Compressed air is conducted from an air line 184 to the lower end of the cylinder through a throttle valve 185 and a three-way two-position control valve 186, the latter including an electromagnet 187 which is deenergized to air-admitting position when the gate is to be raised. Air is exhausted from the lower end of the cylinder through the three-way valve 186 when the electromagnet 187 is energized, and flows through a throttle valve 188 in an exhaust line 189 to limit the rate of gravity descent of the gate. Associated with the gate are two normally open limit switches 190 and 191 which are closed by the gate when the gate is completely down in its guarding position and are connected in circuit as hereinafter described to prevent closing of the dies when the gate is out of closed or guarding position.

Referring to FIG. 11, electric power is supplied to the controller system from alternating current line conductors 192 and 193 which are connected to terminals of switch sections 33a and 33b of the door switch 33 through a line switch 194 and the multiple-contact connector 31, 32. The line conductor 193 further includes a fuse 195 and a normally closed "Stop" push-button switch 196. The other terminals of the door switch sections 33a and 33b are connected to respective bus conductors 197 and 198. The bus conductor 198 is connected by a conductor 199 to one set of terminals of a double-pole "Start" push-button switch 200, 201, here shown to be located at a point external to the controller. The other terminal of the push-button switch section 200 is connected by a conductor 202 to a terminal of the winding 122a of the relay 122, and the other terminal of this winding is connected to the bus conductor 197 through the current-limiting resistors 148a. The circuit through the push-button switch section 200 further includes in series the gate-operated limit switch 190 and the reset limit switch 90 actuated by the contactor arm 50 of the main timer, so that both of these limit switches must be closed before the relay 122 can be energized by depressing the push-button switch 200, 201. The relay 122 includes the winding 122a and a pair of switch sections 122b and 122c, the common terminals of these switch sections being connected to the bus conductor 198. The normally open contact of the relay switch section 122c is connected to a bus conductor 203, so that when the relay 122 is energized the switch section 122c will close and line voltage will be impressed on the bus conductors 197 and 203. The indicator lamp 139 is connected between the bus conductor 197 and a normally closed contact of the relay switch section 122b, so that this lamp will light when the relay is deenergized and will be extinguished when the relay is energized. The other or normally open contact of the relay switch section 122b is connected to a terminal of the relay winding 122a and forms a holding contact to continue energization of the relay 122 after the "Start" push-button switch is released.

The relay 122 is automatically deenergized at the end of the press cycle by short-circuiting the relay winding 122b, as hereinafter described, the current being then limited by the resistor 148a. The relay 122 can also be manually deenergized at any point in the cycle by opening the circuit through the relay winding at the "Stop" push-button 196, and can be either manually or automatically deenergized under abnormal conditions by short-circuiting the relay winding. For the latter purpose, a conductor 204 is connected at one end to the junction of the resistor 148a with the relay winding 122a and at the other end is connected through a normally open switch 205 to the conductor 199. The switch 205 may be located at any convenient point and may be in the form of a push-button switch or limit switch. The junction between the resistor 148a and the relay winding 122a is connected by a conductor 206 to the jacks 147a marked "Cycle End." One of the flexible jumper cords 78, here designated as 78n, is connected to any one of the jacks 147a, and the contact pin 64n of this jumper cord is placed at a suitable point in the one of the panel slots 60, 61 and 62 to be engaged by the movable contactor arm 50 of the main timer at the end of the press cycle. A circuit is thus established from the bus conductor 203, through the contactor arm 50, the contact-carrying jumper cord 78n, and the resistor 148a, thus short-circuiting the relay winding 122a and deenergizing the relay 122. A conductor 207 is connected from the jack conductor 206 to the limit switch contact 88 for the main timer contactor arm, so as to short-circuit and thus deenergize the relay winding 122b if the "Cycle End" circuit should fail, or if the jumper cord 78n is omitted.

The relay 123 has a winding 123a connected across the bus conductors 197 and 203 so as to be energized whenever the relay 122 is energized. The relay 123 includes switch sections 123c and 123b, the former being normally open and the latter forming a spare which is not used in the present circuit. The relay 123 may be omitted if the relay switch section 123c is made a part of the relay 122.

The bus conductor 197 is connected to a terminal of each of the main and auxiliary timing motors 40 and 41 and to a terminal of each of the clutch electromagnets 42 and 43. The bus conductor 203 is connected to the other terminal of the clutch electromagnet 42 for the main timer, so as to energize this electromagnet to clutching position whenever the bus conductors 197 and 203 are energized. The main and auxiliary timing motors are selectively energized by operation of the relays 129 and 130, as hereinafter described. The relay 129 includes a winding 129a and a pair of switch sections 129b and 129c, the switch section 129b having normally open holding contacts, and the switch section 129c being of the single-pole double-throw type. The bus conductor 203 is connected to a terminal of the relay switch section 129b and to the common terminal of the relay switch section 129c. As above noted, the main and auxiliary timing motors 40 and 41 each have a terminal connected to the bus conductor 197. These timing motors have their other terminals connected by respective conductors 208 and 209 to the selective terminals of the relay switch section 129c so that when the relay 129 is deenergized the main timing motor will run and when the relay 129 is energized the main timing motor will stop and the auxiliary timing motor will run. However, the clutch electromagnet 42 of the main timing motor will remain energized, so that when this motor stops the main timer contactor arm 50 will not reset but will remain at its attained position. The clutch electromagnet 43 of the auxiliary timing motor is connected across this motor, so as to be energized whenever this motor is running and to be released whenever this motor is deenergized. Accordingly, when the auxiliary timing motor stops the contactor arm 51 thereof will reset to its starting or zero position. The indicator lamp 138 is also connected across the auxiliary timing motor so as to light whenever the auxiliary timing motor is running.

The auxiliary timing motor 41 is placed in operation one or more times during the process cycle, so that the maximum timing range of the controller may be extended for a considerable period several times as long as the timing range of either of the timing motors. The maximum timing range of the main timing motor is preferably shorter than the maximum timing range of the auxiliary timing motor, and is spread over a 180° scale, so as to facilitate accurate setting of the contact pins 64 for controlling the various steps or events in the process cycle, including steps of short duration and rapidly succeeding steps.

The operation of the auxiliary timing motor 41 is controlled by the relay 130 which has a high resistance winding 130a and a switch section 130b of the single-pole double-throw type. The common terminal of the switch section 130b is connected by a conductor 210 to the normally open contact of the holding switch section 129b of the relay 129. The relay winding 129a has one terminal connected to the bus conductor 197 and the other terminal connected by a conductor 211 to the normally closed contact of the relay switch section 130b. The common terminal of the relay switch section 130b is connected by a conductor 212 to the "On" jacks 146a for the auxiliary timer. The relay winding 130a is energized by rectified unidirectional current from the bus conductors 197 and 203. One terminal of the relay winding 130a is connected to the bus conductor 197 through a rectifier 213, such as of the dry disk type, and a current-limiting resistor 214. The other terminal of the relay winding 130a is connected by a conductor 215 to the "Off" jack 146b of the jack group 146 for the auxiliary timer, this conductor also being connected to a normally open holding contact of the relay switch section 130b. A filter capacitor 216 of relatively large capacitance, for example 40 mfd., is connected across the relay winding 130a and insures energization of this winding regardless of possible chattering of contacts. A jumper cord 78g is connected to one of the "On" jacks 146a and has its contact pin 64g placed at a suitable location in any one of the panel slots 60, 61 and 62 to be engaged by a contact shoe of the main timer contactor arm 50. A jumper cord 78h is connected to the "Off" jack 146b and has its contact pin 64h mounted at a suitable point in the panel slot 63 for the auxiliary timer to be engaged by the contactor arm 51 after a lapse of a predetermined period. The "Off" jack 146b is also connected by a conductor 217 to the limit switch contact 102 for the auxiliary timing arm.

When a contactor shoe of the main contactor arm 50 engages the contact pin 64g of the jumper cord 78g, a circuit is established from the bus conductor 203, through the main contactor arm 50, the jumper cord 78g, the "On" jack 146a for the auxiliary timer, the conductor 212, the relay switch section 130b, the conductor 211, and the relay winding 129a to the bus conductor 197, thus energizing the relay 129. The holding switch section 129b of the relay 129 is actuated to holding position, and the relay switch section 129c is actuated to a position opening the circuit through the conductor 208 to stop the main timing motor and closing a circuit through the conductor 209 to energize the auxiliary timing motor. A branch holding circuit for the relay 129 is completed through the series-connected relay switch sections 129b and 130b. The auxiliary timer continues to run, and when the contactor arm 51 of the auxiliary timer engages the contact pin 64h of the jumper cord 78h a circuit is established from the bus conductor 203, through the contactor arm 51, jumper cord 78h, "Off" jack 146b, conductor 215, relay winding 130a, rectifier 213, and resistor 214 to the bus conductor 197, thus momentarily energizing the relay 130 to actuate the relay switch section 130b thereof to a position opening the circuit through the relay winding 129a. The switch sections 129b and 129c of the relay 129 return to their former positions, the switch section 129c opening the circuit through the auxiliary timing motor 41 to stop this motor and to reset the timer arm 51 thereof, and reclosing the circuit through the main timing motor 40 to restart the latter motor from its stopped position. The resetting of the auxiliary timer arm 51 opens the circuit through the jumper cord 78h, thus deenergizing the relay 130. The capacitor 216 across the winding 130a of the relay 130 provides a delay action and insures against release of this relay until the main timer arm contact shoe leaves the contact pin 64g, thus avoiding accidental reclosing of the relay 129. If the "Off" jumper cord 78h should be omitted, or fail to make proper contact, the auxiliary timing motor will run for its maximum period, and the relay 130 will be momentarily energized by a circuit established through the limit switch contact 102 and conductor 217.

The relay 124 controls the opening and closing of the main ram 151 of the press, as hereinafter described, and includes a winding 124a and switch sections 124b and 124c, the former being a normally open holding switch section one terminal of which is connected to the bus conductor 203 and the other terminal being connected to a terminal of the relay winding. The other terminal of the relay winding 124a is connected to the bus conductor 197 through the current-limiting resistor 148b. The indicator lamp 133 is connected across the relay winding 124a. The terminals of the relay winding 124a are connected by conductors 218 and 219 to the respective sets of the panel jacks 141a and 141b. One of the jumper cords 78, more specifically numbered 78a, is connected to any one of the jacks 141a and has its contact pin 64a disposed at or near the zero position of the panel slot 62, so as to be engaged by a contact shoe 52 of the main timer arm 50 at or shortly after the time the main timing motor starts in operation. The momentary contact made with the main timer arm closes a circuit from the bus conductor 203, through the timer arm 50, contact pin 64a, the jumper cord 78a, the jack 141a, the conductor 218, the relay coil winding 124a, the resistor 148b, to the bus conductor 197, thus energizing the relay 124 and shifting the relay switch sections 125b and 124c to their energized position, the holding switch section 124b closing to continue the energization of this relay. The indicator lamp 133 connected across the relay winding 124a is lighted whenever the relay 124 is energized. The relay 124 is deenergized by short-circuiting its winding. For this purpose a jumper cord 78m is connected to any one of the set of "Open" jacks 141b, and its contact pin 64m is clamped at a suitable point in any one of the panel slots 60, 61 and 62. When the main timer arm engages the contact pin of the jumper cord 78m, the relay winding 124a will be short-circuited and deenergized in the same manner as the relay winding 122a.

The relay 125 controls the application of high pressure to the main ram, as hereinafter described, and includes a winding 125a and a pair of switch sections 125b and 125c, the former being a holding switch section and the latter being of the single-pole double-throw type and being connected in circuit as hereinafter described. One terminal of the holding switch section 125b is connected to the bus conductor 203, and the other terminal is connected to a terminal of the relay winding 125a. The other terminal of the relay winding is connected to the bus conductor 197 through a current-limiting resistor 148c. The indicator lamp 135 is connected across the relay winding 125a. The terminals of the relay winding 125a are connected by respective conductors 220 and 221 to the "On" jacks 143a and the "Off" jacks 143b of the jack group 143. A jumper cord 78b is connected to the "On" jacks 143a and has its contact pin 64b disposed at a suitable point on the slotted controller panel. This point is a short angular distance from the starting position, as it is desirable to apply the high pressure on the main ram as soon as the press is closed and before the transfer ram is operated. The relay 125 is energized through its associated jumper cord 78b in the same manner as the main ram relay 124, and is retained in energized condition by its holding switch section 125b. In the present press-controlling system, the high-pressure relay 125, after being energized, remains energized for the rest of the press cycle. However, in some systems this relay can be deenergized during the cycle by connecting a jumper cord to one of the "Off" jacks 143b for short-circuiting the relay winding. In such case the relay winding 125a will be short-circuited and deenergized in the same manner as the main ram relay winding 124a.

The relays 126 and 127 control the transfer ram of the press, as hereinafter described, and have respective windings 126a and 127a. The relay 126 includes single-pole double-throw switch sections 126b and 126c, the former being a holding switch section. The relay 127 includes three single-pole switch sections 127b, 127c and 127d, the switch sections 127b and 127d being normally closed and the switch section 127c being normally open. The relay windings 126a and 127a have common terminals connected to the bus conductor 197 through a current-limiting resistor 148d, and these terminals are connected by a conductor 222 to the "Open" panel jacks 142b. The second terminal of the relay winding 126a is connected by a conductor 223 to the "Closed" panel jacks 142a and to a terminal of the relay switch section 127b, and the second terminal of the relay winding 127a is connected by a conductor 224 to the "Neutral" panel jacks 142c and to a terminal of the relay switch section 127c. The indicator lamp 134 is connected across the relay winding 126a. The common terminal of the relay holding switch section 126b is connected to the bus conductor 203. The normally closed contact of the relay switch section 126b is connected by a conductor 225 to the normally open contact of the relay switch section 127c, and the normally open contact of the relay switch section 126b is connected by a conductor 226 to the normally closed contact of the relay switch section 127b. The switch sections of the relays 126 and 127 are connected in press-controlling circuits as hereinafter described. Jumper cords 78c, 78k and 78f are connected to the respective panel jacks 142a, 142b and 142c and have their respective contact pins 64c, 64k and 64f disposed at suitable points in the panel slots for the main timer.

The relay 128 controls the "breathing" or "degassing" step, as hereinafter described, this being effected by slightly opening the movable die 154 one or more times during the cycle. The relay 128 includes a winding 128a and a pair of switch sections 128b and 128c, the former being a holding switch section and the latter being of the single-pole double-throw type and being connected in circuit as hereinafter described. One terminal of the holding switch section 128b is connected to the bus conductor 203, and the other terminal of the switch section is connected to a terminal of the relay winding. The other terminal of the relay winding 128a is connected to the bus conductor 197 through a current-limiting resistor 148e. The indicator lamp 136 is connected across the relay winding. The terminals of the relay winding are connected by respective conductors 227 and 228 to the "On" jacks 144a and "Off" jacks 144b of the jack group 144. Jumper cords 78d and 78e are respectively connected to these "On" and "Off" jacks and have their contact pins 64d and 64e disposed at suitable points on the slotted front panel of the controller. The relay 128 is energized and deenergized through the jumper cords 78d and 78e in the same manner as the main ram relay 124.

The "Preheat" jacks 145a are connected by a conductor 229 to a terminal of a thermostatically controlled electronic preheater 230 of conventional type per se for heating slugs of the plastic molding material. The other terminal of the preheater is connected to the line conductor 197 which is extended externally of the controller through the multiple contact connector 31, 32. An indicator lamp 231 is connected to the preheater, and the indicator lamp 137 is connected between the conductor 229 and the bus conductor 197. A jumper cord 78j connected to one of the jacks 145a has its contact pin 64j disposed at a selected point on the slotted controller panel to be engaged by the main contactor arm 50, thus starting the preheater in operation at a suitable time before the end of the current press cycle, so that one or more heated slugs of plastic molding material will be available for feeding into the press at the beginning of the next press cycle.

The extended bus conductor 197 is connected to a terminal of the relay 131 and to common terminals of the various valve electromagnets, namely, the electromagnets 162 and 163 of the main ram control valve 161, the electromagnets 165 and 166 of the transfer ram control valve 164, the electromagnet 170 of the high-pressure control valve 169, the electromagnet 174 of the speed control valve 173 for the main ram, and the electromagnet 187 of the gate control air valve 186. The extended bus conductor 199 is connected to a terminal of the relay switch section 123c and to a terminal of the relay switch section 124c. A conductor 232 connects the second terminal of the push button switch section 201 with the second terminal of the air valve electromagnet 187, the second terminal of the relay winding 131a, and a terminal of the relay switch section 124c. Closing of the push-button switch section 201 closes a circuit through the conductor 232, energizing the air valve electromagnet 187 so as to actuate the air valve 186 to its exhaust position, permitting gravity descent of the gate 181. A parallel circuit is established through the relay winding 131a to energize this winding. Holding circuits for the air valve electromagnet 187 and relay 131 are established through the subsequently actuated switch section 124c of the main ram relay 124, this relay switch section in its closed position shunting the push-button switch section 201. A conductor 233 connects the normally open contact of the relay switch section 123c with the common or center contact of the relay switch section 128c. The normally closed contact of the relay switch section 128c is connected by a conductor 234 to the common or center contact of the relay switch section 131b and to a terminal of the normally open relay switch section 127d. The other terminal of the relay switch section 127d is connected by a conductor 235 with the common or center contact of the relay switch section 126c.

The second terminal of the electromagnet 162 of the main ram control valve is connected by a conductor 236 with a terminal of the gate limit switch 191, and the other terminal of this limit switch is connected by a conductor 237 with the normally open contact of the relay switch section 131b, so that when the main ram relay 124 and relay 131 are energized and the gate is down, a circuit will be established to energize the valve electromagnet 162 and thus close the press, this circuit including the conductor 234, the relay switch section 128c, the conductor 233, and the then closed relay switch section 123c. A conductor 238 connects the second terminal of the retraction electromagnet 163 of the main ram control valve with the normally closed contact of the relay switch section 131b. The relay 131 thus controls selective energization of the main ram control valve electromagnets 162 and 163.

A conductor 239 connects the second terminal of the electromagnet 162 with a terminal of the main ram limit switch 177, and a conductor 240 connects the other terminal of this limit switch with a terminal of the relay switch section 125c. The last-mentioned relay switch section terminal is also connected by a conductor 241 with the second terminal of the speed control valve electromagnet 174. The second terminal of the main ram valve electromagnet 163 is further connected by a conductor 242 with a terminal of the main ram limit switch 176, and the other terminal of this limit switch is connected by a conductor 243 with the normally open contact of the relay switch section 128c. The second terminal of the high-pressure valve electromagnet 170 is connected by a conductor 244 with the normally open contact of the relay switch section 125c.

The second terminal of the transfer ram control valve electromagnet 165 is connected by a conductor 245 with the normally open contact of the relay switch section 126c so as to energize this electromagnet when the relay 126 is energized, and thus advance the ram. The second terminal of the transfer ram control valve electromagnet 166 is connected by a conductor 246 to a terminal of the transfer ram limit switch 180, and the other terminal of this limit switch is connected by a conductor 247 with the normally closed contact of the relay switch section 126c. The limit switch 180 opens the circuit through the valve electromagnet 166 to limit the retracting stroke of the transfer ram. The relay 126 controls the alternate energization of the transfer ram valve electromagnets 165 and 166. As hereinafter more fully described, the relay 127 cooperates with the relay 126 to prevent energization of either of these electromagnets so as to hold the transfer ram valve in its intermediate or neutral position while the transfer ram plunger is in an advanced position. This will trap oil in the transfer ram cylinder 156 and hold the transfer ram plunger in its attained position.

In setting up the controller for use, the cabinet door 24 is open, and the contact pins 64 of the various jumper cords 78, after being inserted into the end enlargements 80 of the front panel slots, are shifted along the slots and are clamped at selected points along the slots corresponding to the desired timing of the various events in the cycle of operation of the press. The plugs 79 of the jumper cords are inserted into the appropriate front panel jacks. During this adjustment the door switch 33 is open, thus avoiding danger of short-circuiting and shock. The contactor arms 50 and 51 can be swung manually through their full arcs of forward travel by their respective pointers 81 and 83 to test the mechanical action, these arms being returned to starting position by their torsion springs.

When the press is ready for a cycle of operation, the movable upper die 150 on the main ram 151 is in its upwardly retracted position, the transfer ram 155 is in its downwardly retracted position, and the safety gate 181 is in its upwardly retracted position. The line switch 194 and door switch 33 both being closed, the line conductors 192 and 193 are respectively connected to the bus conductors 197 and 198, and the indicator lamp 139 is lighted through switch section 122b of the deenergized relay 122, showing that the press is ready to start. The operator then places one or more slugs of molding material in the chamber 158 above the transfer ram plunger 157. In some instances these slugs have first been preheated in the electronic preheater 230.

To initiate the press cycle, the operator depresses the "Start" push-button switch 200, 201, and holds it in depressed position for a short interval. In this interval, the push-button switch section 201 closes a circuit through the safety gate solenoid 187 by way of the conductors 197, 232, and 199, and also closes a parallel circuit energizing the relay 131. The gate air valve 186 is thus actuated to a position permitting exhausting of the gate air cylinder 183 and gravity descent of the gate to its guarding position. When the gate is completely down it closes the limit switches 190 and 191, the former establishing a circuit through relay winding 122a by way of the push-button switch section 200, conductor 202, and reset limit switch 90, thus energizing the relay 122 and actuating its switch sections 122b and 122c. A holding circuit is established through the relay winding 122a by way of the actuated relay switch section 122b, and the previously lighted indicator lamp 139 is extinguished, whereupon the operator releases the "Start" push-button. The actuation of the relay switch section 122c connects the bus conductor 198 with the bus conductor 203, the latter being connected to the movable contactor arms 50 and 51 of the main and auxiliary timers, and both of these contactor arms then being in their starting position. The relay 123 connected between the bus conductors 197 and 203 is energized, actuating its switch section 123c to closed position. The clutch electromagnet 42 of the main timer motor 40 is energized from the bus conductors 197 and 203, and the main timer motor is energized through the switch section 129c of the deenergized relay 127, thus starting the main timer motor. At this time the main timer contactor arm 50 engages the contact pin 64a of the jumper cord 78a, establishing a circuit through the main ram relay winding 124a by way of the conductor 218 and resistor 148b. The indicator lamp 133 lights, and the actuated holding switch section 124b of the relay 124 establishes a holding circuit continuing the energization of this relay after the contact at the contact pin 64a is interrupted during the further travel of the contactor arm 50. The actuated switch section 124c of the relay 124 establishes a holding circuit through the conductors 199 and 232, continuing the energization of the relay winding 131a and also continuing the energization of the gate valve solenoid 187 so that the gate will remain down after the "Start" push-button is released. The relay 131 is energized whenever the main ram relay 124 is energized.

When the relay 124 is actuated, it establishes a circuit energizing the electromagnet 162 of the main ram control valve 161, causing oil under pressure to flow from the low-pressure supply line 160 through the check valve 167 and pipe 168 into the upper end of the main ram cylinder 152 to advance the die-carrying ram plunger 153 to its closed position, oil being exhausted from the lower end of the main ram cylinder through the control valve. During this plunger stroke, the speed-control valve 173 is open. The circuit through the valve electromagnet 162 extends from the bus conductor 197, through the electromagnet, the conductor 236, the closed gate limit switch 191, the conductor 237, the actuated relay switch section 131b, the conductor 234, the relay switch section 128c, the conductor 233, the actuated relay switch section 123c, to the bus conductor 199. Near the end of the main ram stroke, the main ram limit switches 176 and 177 close, the latter switch closing first and establishing a circuit to energize the electromagnet 174 of the speed control valve 173 for closing this valve, the oil flow being then restricted through the throttle valve 175. The circuit through the valve electromagnet 174 extends from the bus conductor 197, the electromagnet, the conductors 241 and 240, the limit switch 177, and the conductors 239 and 236, placing the valve electromagnets 162 and 174 in parallel. The main timer contactor arm 50 in its travel now makes contact with the contact pin 64b energizing the relay 125 and establishing a circuit for opening the high-pressure valve 169. The relay circuit extends through the jumper cord 78b, the jack 143a, the conductor 220, the relay winding 125a, and the resistor 148c to the bus conductor 197. The actuated relay switch section 125b establishes a holding circuit through the relay winding 125a, and the actuated relay switch section 125c establishes a circuit through valve electromagnet 170 of the high-pressure valve by way of the conductors 244 and 240, and closed main ram limit switch 177. The indicator lamp 135 is lighted when the relay winding 125a is energized. In a short further travel, the main timer contactor arm 50 engages the contact pin 64c to establish a circuit energizing the transfer ram relay 126 for effecting advance of the transfer ram plunger 157. A holding circuit for the relay winding 126a is closed through the relay switch sections 126b and 127b. The transfer ram valve electromagnet 165 is energized through a circuit extending from the bus conductor 197, through the electromagnet, the conductor 245, the actuated relay switch section 126c, the relay switch section 127d, the conductor 234, the relay switch section 128c, the conductor 233, the actuated relay switch section 123c, and to the bus conductor 199. The valve 164 admits oil under high pressure to the lower end of the transfer ram cylinder 156 and exhausts oil from the upper end of this cylinder, raising the transfer ram plunger and injecting molding material into the mold cavity.

After a short time interval, for example about 15 seconds, a "breathing" or "degassing" step takes place, this being accomplished by momentarily raising the movable die a short distance, for example about 1/16″, to permit escape of gas from the material being molded in the die cavity. The breathing step is initiated by the timer arm 50 making contact with the contact pin 64d to close a circuit through the relay winding 128a by way of the jumper cord 78d, jack 144a, and conductor 227. Energization of the relay 128 actuates the switch section 128b to establish a holding circuit for this relay, and actuates the relay switch section 128c to open the circuit through the main ram valve electromagnet 162 and to close a circuit through the main ram valve electromagnet 163 by way of the conductor 243, limit switch 176, and conductor 242 to shift the valve 161 to a position admitting oil to the lower end of the main ram cylinder and exhausting oil from the upper end of this cylinder. While the relay 128 is energized the indicator lamp 136 is lighted. Also, while the relay 128 is energized, the transfer ram valve electromagnet 165 is deenergized by opening the electromagnet circuit at the relay switch section 128c, thus placing the transfer ram valve 164 in neutral position and trapping oil in the transfer ram cylinder to hold the transfer ram plunger 157 at its attained position. After the upper die travels about 1/16″ the limit switch 176 opens, thus deenergizing the main ram valve electromagnet 163 and resetting the main ram valve to its neutral position. After a short time interval, usually a few seconds, the main timer contactor arm 50 engages the contact pin 64e, establishing a momentary circuit by way of the jumper cord 78e, the jack 144b, and conductor 228 to short-circuit and deenergize the relay winding 128a, thus shifting the relay switch section 128c to a position reenergizing the main ram valve electromagnet 162 and causing the press to reclose, and reenergizing the transfer ram valve electromagnet 165 to reapply oil pressure to the transfer ram plunger, causing a further advance of this plunger for injecting additional molding material into the mold cavity. If additional "breathing" steps are desired it is only necessary to provide additional sets of plugged-in jumper cords 78d and 78e, placing the contact pins 64 thereof at suitable points on the slotted controller panel.

After "breathing" is completed, the molded piece remains in the closed dies for a suitable predetermined period of time to effect curing. During the curing period, the transfer ram control valve 164 is left in neutral position to relieve the transfer ram cylinder of high oil pressure and thus reduce wear on the cylinder and valve packings and minimize oil leakage, oil being trapped in the transfer ram cylinder to maintain the transfer ram plunger in its advanced position. This is accomplished by energizing the relay 127 to open its switch section 127d and thus open the circuit through both of the transfer ram valve electromagnets 165 and 166. The relay 127 is energized through a circuit including the contact pin 64f, the jumper cord 78f, the jack 142c, the conductor 224, the relay winding 127a, and the resistor 148d. Actuation of the relay switch section 127b opens the holding circuit through the relay winding 126a, thus deenergizing the relay 126, and a holding circuit for the relay 127 is then established through the relay switch sections 126b and 127c. The transfer ram plunger remains in advanced position without pressure on it for the rest of the cure period. However, in some instances it may be desired to pump the transfer ram plunger near the end of the cycle, as for removing cull, in which case additional jumper cords 78c and 78k would be provided for manipulating the transfer ram.

When the cure period is longer than can be accommodated by the main timer, use is made of the auxiliary timer. When the main timer contactor arm 50 engages the contact pin 64g a circuit is established through the jumper cord 78g, jack 146a, conductor 212, and relay switch section 130b to energize the relay 129, thus actuating the relay switch sections 129b and 129c, the former establishing a holding circuit for the relay winding 129a and the latter switch section opening the circuit through the main timing motor 40 and closing the circuit through the auxiliary timing motor 41, as hereinbefore described. The main timer arm 50 remains at its attained position, since the clutch electromagnet 42 remains energized. The auxiliary timing motor runs, driving the auxiliary timer arm 51 until this arm engages the contact pin 64h, closing a circuit through the jumper cord 78h, "Off" jack 146b and conductor 215 to energize the relay 130. The actuation of the relay switch section 130b opens the holding circuit for the relay 129, and the released switch section 129c of this relay opens the circuit through the auxiliary timing motor and recloses the circuit through the main timing motor, thus stopping the auxiliary timing motor and resetting its contactor arm 51, and restarting the main timing motor to continue the travel of the contactor arm 50. Although the circuit to the relay 130 is immediately broken at the contact pin 64h, deenergization of the relay winding 130a is delayed by the shunt capacitor 216 until the main contactor arm 50 moves safely out of engagement with the contact pin 64g, so as to avoid danger of accidental recycling. The capacitor 216 also insures energization of the relay 130 regardless of possible poor contact at the contact pin 64g, as by reason of the presence of dust or dirt. If required, the operation of the auxiliary timer can be repeated one or more times by providing one or more additional jumper cords 78g plugged into the jacks 146a.

The main timer arm 50, in its further travel, engages the contact pin 64j for momentarily closing a circuit through the jumper cord 78j, jack 145a, and conductor 229 to energize the electronic slug preheater 230, as hereinbefore described. The preheater continues in operation for a timed interval determined by the usual control means, not shown, forming a part of the preheater.

After the curing period, the main timer arm 50 engages the contact pin 64k to establish a circuit through the jumper cord 78k and jack 142b for short-circuiting and deenergizing the relay winding 127a, thus reclosing the relay switch section 127d to energize the retraction electromagnet 166 of the transfer ram control valve 164, the circuit through this electromagnet extending through the closed limit switch 180, conductor 247, and relay switch sections 126c and 127d. Oil under pressure is admitted through the shifted control valve 164 to the upper end of the transfer ram cylinder to retract the transfer ram plunger, and oil is exhausted from the lower end of the cylinder through the valve. The transfer ram plunger descends until it engages the adjustably positioned limit switch 180 which opens the circuit through the valve electromagnet 166. The retracting travel of the transfer ram need be only sufficient to permit convenient access to the open dies for reloading.

Shortly before or after retraction of the transfer ram plunger, or simultaneously therewith, the timer arm 50 engages the contact pin 64m, closing a circuit through the jumper cord 78m, jack 141b, and conductor 219 to short-circuit and thus deenergize the main ram relay winding 124a. The relay switch sections 124b and 124c open, the latter opening the circuit through the winding of the relay 131 and air valve solenoid 187. The released switch section 131b of the relay 131 thereupon opens the circuit through the main ram valve electromagnet 162, the speed control valve electromagnet 174, and the high pressure valve solenoid 170, and closes a circuit through the main ram valve electromagnet 163 by way of the conductor 238, thus actuating the main ram valve 161 to a position admitting oil to the lower end of the main ram cylinder 152 and exhausting oil from the upper end of the cylinder. The main ram plunger 153 is thus raised to open the press, and the gate member 181 is lifted by air pressure to its open position. Soon thereafter, the main timer contact arm 50 engages the contact pin 64n, thus establishing a circuit by way of the jumper cord 78n, jack 147a and conductor 206 to short-circuit the winding of the relay 122, thus deenergizing this relay and removing line voltage from the bus conductor 203. This stops the main timer motor and deenergizes the relays 123 and 125. The clutch electromagnet 42 of the main timer motor is also deenergized, causing the main timer contactor arm 50 to reset to its starting position under the retarding effect of the dashpot 91, 93. The operator then removes the finished molded piece from the press, and cleans the die cavity as by means of an air hose, not shown. Another charge or slug of molding material, which has been heated by the preheater 230, is then placed in the die chamber 158, and the press is ready for the next cycle of operation. The press cannot re restarted prematurely, since the limit switch 90 will be closed only after the main timer arm 50 is completely reset to its starting position.

If in its closing travel the safety gate 181 does not reach its fully closed or guarding position, as by reason of an obstruction such as the hand of the operator, or a loading tray, the limit switches 190 and 191 will not close, thus preventing starting and closing of the press. In the event that the operator should slightly raise the gate after it has reached guarding position, the limit switches 190 and 191 will open, the latter switch then preventing or interrupting energization of the main ram valve electromagnet 162 so as to prevent a closing travel of the main ram plunger. The opening of the limit switch 191 will also prevent or interrupt energization of the high pressure valve electromagnet 170.

If the plug-in controller unit should require maintenance, it can be quickly removed from the cabinet and be replaced by an identically arranged spare unit, thus minimizing interruption of press service. As the door switch 33 is open during the substitution there is no danger of short-circuit or shock.

The reset limit switch 90, which is closed only when the main timer arm 50 is in starting position, will prevent premature recycling whether each press cycle is manually initiated, as in the system illustrated, or is automatically initiated, as in the case of a fully automatic press.

The controller unit has a wide range of set-up adjustment to meet different operating conditions, and can be connected in various control circuits to suit different types of presses.

While the controller unit is here shown to control a plastic molding press, it can also be used to control the cyclic operation of other machines and apparatus.

I claim:

1. In an electrical controller, a panel having a slot therethrough, a contact member extending through said slot against relative rotation and shiftable therealong in a continuous range of adjustment, means for rigidly clamping said contact member to said panel at a selected position along said slot, and a contactor movable in a path adjacent to said panel in a direction along said slot and engageable with said contact member, said contact member having an enlarged portion engageable behind said panel, said slot having an enlargement permitting axial insertion and withdrawal of said contact member, and said slot enlargement being larger than the enlarged portion of said contact member.

2. In an electrical controller, a panel having a slot therethrough, at least one contact stud extending through said slot and adapted to be engaged by a movable contactor, said contact stud having a key portion disposed in said panel slot to resist rotation of said stud about its axis and having an abutment engaging a face of the panel, and a screw-threaded member engageable with said stud at the portion thereof projecting from the other face of the panel for clamping said stud to said panel at a selected position along said slot.

3. In an electrical controller, a panel having a slot therethrough, at least one contact stud extending through said slot and adapted to be engaged by a movable contactor, said contact stud having a key portion disposed in said panel slot to resist rotation of said stud about its axis and having an abutment engaging a face of the panel, a screw-threaded member engageable with said stud at the portion thereof projecting from the other face of the panel for clamping said stud to said panel at a selected position along said slot, and an insulating member surrounding said stud to prevent metallic engagement with a laterally adjacent contact stud.

4. In an electrical controller, a controller chassis comprising first and second parallel panels forming a space between them, said first panel having a slot therein, a contact member extending through said slot into the space between said panels, said contact member being shiftable along said slot in a continuous range of adjustment and being retained rigidly in selected position along said slot, a contactor movable in the space between said panels on a forward timing travel and engageable with said contact member, and a timing motor carried by said second panel and having a releasable driving connection with said movable contactor, said contactor being also movable on a reverse resetting travel during which said driving connection is released.

5. In an electrical controller, a controller chassis comprising first and second parallel panels forming a space between them, said first panel having a slot therein, a contact member extending through said slot into the space between said panels, said contact member being shiftable along said slot in a continuous range of adjustment and being retained rigidly in selected position along said slot, a contactor movable in the space between said panels on a forward timing travel and engageable with said contact member, a timing motor carried by said second panel and having a releasable driving connection with said movable contactor, jacks carried by said chassis, and a flexible jumper cord selectively connecting said contact member with said jacks, said contactor being also movable on a reverse resetting travel during which said driving connection is released.

6. In an electrical controller, a slotted panel, a plurality of contact members extending through said panel against relative rotation and individually shiftable along the slotted portions of said panel in a continuous range of adjustment, means for rigidly clamping said contact members to said panel at selected positions thereof, and circuit-controlling means including a contactor movable in a path adjacent to said panel in a direction along the slotting in the panel and successively engageable with said contact members.

7. In an electrical controller, switching means including a timing member movable in one direction on a timing travel from a starting position and in the other direction on a resetting travel to said starting position, said switching means including a plurality of switching devices successively actuated by said timing member on its timing travel, means for driving said member on its timing travel including a motor and a clutch, means for engaging said clutch including a starting circuit having connected therein a normally open switch actuated to closed position by said timing member when said member returns to its starting position, and electrically controlled means for preventing recycling of said timing member until said member is restored to its starting position.

8. In an electrical controller, switching means including a timing member movable on a timing travel from a starting position, said switching means including a plurality of switching devices successively actuated by said timing member on its timing travel, a timing motor for driving said member on its timing travel, means for restoring said timing member to its starting position after a timing travel, means for energizing said timing motor including a starting circuit having connected therein a normally open switch actuated to closed position by said timing member when said member is restored to its starting position, and electrically controlled means for preventing recycling of said timing member until said member is restored to starting position.

9. In an electrical controller, a rotatable timing member movable in one direction from a starting position on a timing travel and movable in the other direction on a resetting travel to said starting position, biasing means normally urging said timing member in resetting direction, a driving motor, releasable clutch means drivingly connecting said motor and timing member for moving said timing member in timing direction against the opposition of said biasing means, said clutch means including a differential gear having a motor-driven input member and a ring gear and also including an output member operatively connected to said timing member, said clutch means further including an electromagnetic device which when in a first condition holds said differential ring gear against rotation to effect driving of said timing member by said motor, and which when a second condition releases said ring gear to permit rotation of said ring gear by said biasing means during resetting travel of said timing member, and resilient braking means exerting a frictional drag on said ring gear to minimize lost motion during restarting of said timing member by said motor and clutch, whereby to insure a relatively accurate timing travel of said timing member.

References Cited in the file of this patent

UNITED STATES PATENTS

| | | |
|---|---|---|
| 633,951 | Brown | Sept. 26, 1899 |
| 875,698 | Dubs | Jan. 7, 1908 |
| 1,083,486 | Granoux | Jan. 6, 1914 |
| 1,131,104 | Avram | Mar. 9, 1915 |
| 1,938,438 | Petersen | Dec. 5, 1933 |
| 2,076,290 | Bliss | Apr. 6, 1937 |
| 2,195,642 | De Larm | Apr. 2, 1940 |
| 2,216,272 | Kaye | Oct. 1, 1940 |
| 2,263,804 | Gurney et al. | Nov. 25, 1941 |
| 2,267,102 | Huggins | Dec. 23, 1941 |
| 2,309,040 | Boemle | Jan. 19, 1943 |
| 2,312,077 | Cowles | Feb. 23, 1943 |
| 2,388,686 | Habig | Nov. 13, 1945 |
| 2,393,187 | Powell | Jan. 15, 1946 |
| 2,396,308 | Williams | Mar. 12, 1946 |
| 2,542,085 | Kelleigh | Feb. 20, 1951 |
| 2,568,906 | Williams | Sept. 25, 1951 |
| 2,573,130 | Moore et al. | Oct. 30, 1951 |
| 2,631,664 | Poole | Mar. 17, 1953 |
| 2,650,272 | Gavigan | Aug. 25, 1953 |
| 2,668,325 | Goodwin | Feb. 9, 1954 |
| 2,668,985 | Babbit | Feb. 16, 1954 |
| 2,691,693 | Lewis | Oct. 12, 1954 |
| 2,695,923 | Lajeunesse et al. | Nov. 30, 1954 |
| 2,725,852 | Cramer | Dec. 6, 1955 |
| 2,737,056 | Baumgartner | Mar. 6, 1956 |
| 2,740,923 | Loeber | Apr. 3, 1956 |
| 2,765,668 | Milne | Oct. 9, 1956 |
| 2,773,964 | Majkrzak | Dec. 11, 1956 |
| 2,788,850 | Leuenberger | Apr. 16, 1957 |